(12) United States Patent
Kleemann et al.

(10) Patent No.: US 7,149,030 B2
(45) Date of Patent: *Dec. 12, 2006

(54) DIFFRACTIVE OPTICAL ELEMENT AND ALSO OPTICAL ARRANGEMENT COMPRISING A DIFFRACTIVE OPTICAL ELEMENT

(75) Inventors: Bernd Kleemann, Aalen (DE); Hans-Jurgen Rostalski, Oberkochen (DE); Willi Ulrich, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/904,466

(22) Filed: Nov. 11, 2004

(65) Prior Publication Data

US 2005/0073746 A1    Apr. 7, 2005

Related U.S. Application Data

(63) Continuation of application No. 10/818,614, filed on Apr. 6, 2004, now abandoned, which is a continuation of application No. 10/144,452, filed on May 10, 2002, now Pat. No. 6,728,036.

(30) Foreign Application Priority Data

May 12, 2001   (DE)   ............... 101 23 230

(51) Int. Cl.
G02B 5/18   (2006.01)
(52) U.S. Cl. .............. 359/575; 359/566; 359/569; 359/571
(58) Field of Classification Search ......... 359/565–576
See application file for complete search history.

(56) References Cited

U.S. PATENT DOCUMENTS

| | | | | |
|---|---|---|---|---|
| 5,132,843 A | * | 7/1992 | Aoyama et al. | 359/573 |
| 5,561,558 A | * | 10/1996 | Shiono et al. | 359/569 |
| 5,566,023 A | * | 10/1996 | Kley | 359/569 |
| 5,682,266 A | * | 10/1997 | Meyers | 359/571 |
| 6,246,522 B1 | * | 6/2001 | Ishii | 359/571 |
| 6,441,956 B1 | * | 8/2002 | Perlo et al. | 359/355 |
| 6,462,874 B1 | * | 10/2002 | Soskind | 359/565 |
| 6,728,036 B1 | * | 4/2004 | Kleemann et al. | 359/575 |

* cited by examiner

Primary Examiner—Leonidas Boutsikaris
(74) Attorney, Agent, or Firm—Factor & Lake

(57) ABSTRACT

A diffractive optical element has a plurality of diffraction structures for a certain wavelength. These each have a width measured in the plane of the diffractive optical element and a height measured perpendicularly thereto. The widths and the heights of the diffraction structures vary over the area of the diffractive optical element. An optical arrangement comprising such a diffractive optical element has, in addition, a neutral filter. The efficiency of such a diffractive optical element and of such an arrangement can be optimized locally for usable light.

8 Claims, 5 Drawing Sheets

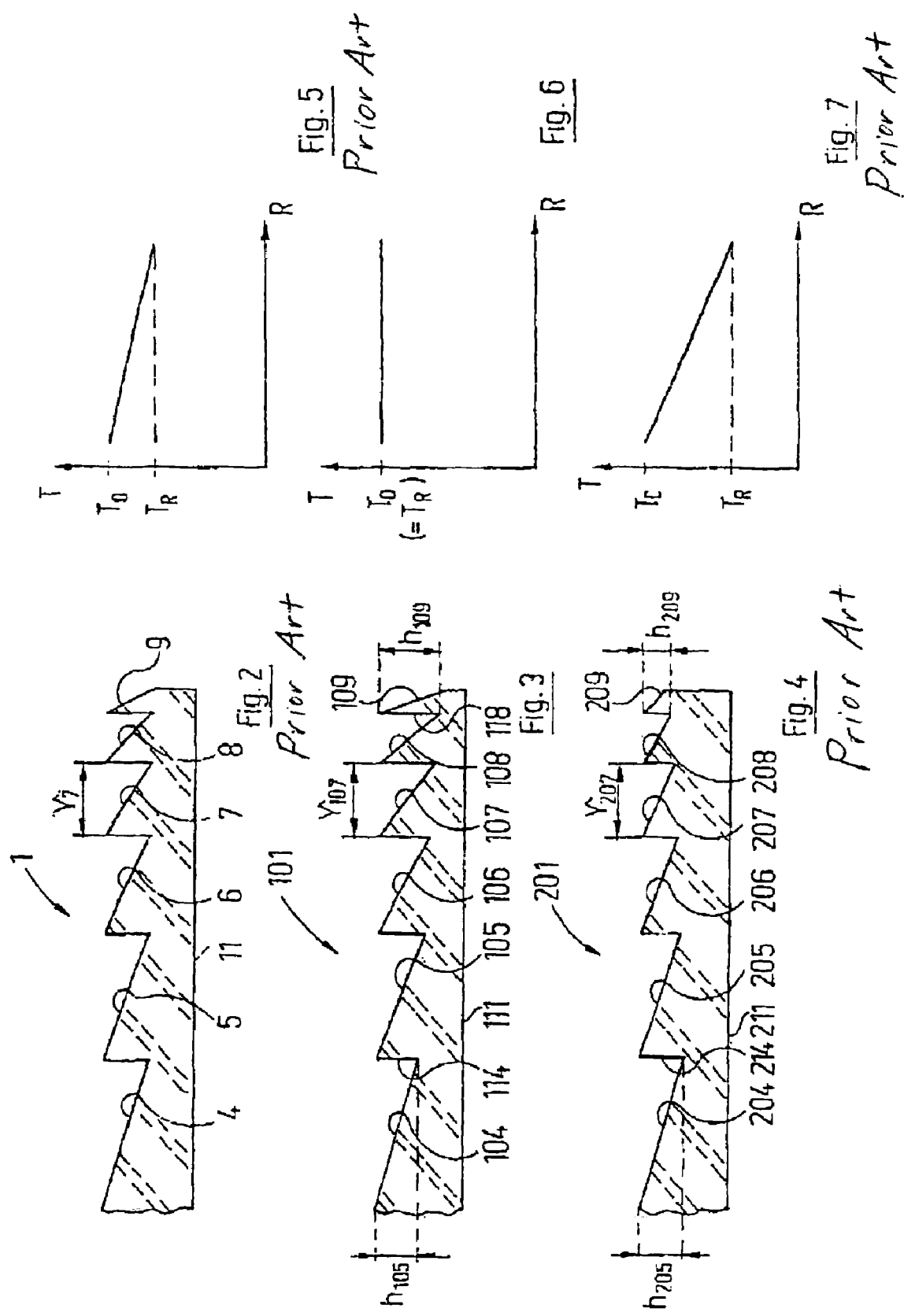

DIFFRACTIVE OPTICAL ELEMENT AND ALSO OPTICAL ARRANGEMENT COMPRISING A DIFFRACTIVE OPTICAL ELEMENT

This application is a continuation of U.S. application Ser. No. 10/818,614, filed in the United States on Apr. 6, 2004 (now abandoned), which is a continuation of U.S. application Ser. No. 10/144,452, filed in the United States on May 10, 2002, now U.S. Pat. No. 6,728,036, which claims priority to German Patent Application No. 101 23 230.6 having a filing date of May 12, 2001.

BACKGROUND OF THE INVENTION

The invention relates to a diffractive optical element and also an optical arrangement comprising a diffractive optical element.

A diffractive optical element is disclosed in the specialist paper "Zonal diffraction efficiencies and imaging of micro-Fresnel lenses" in J. Mod. Opt., 45, 1405, 1998. The latter proposes reducing the structural heights of the diffraction structures with increasing radius of the Fresnel lenses therein, that is to say with decreasing structural width, and this, in the case of the optical boundary conditions chosen therein, results in an increase in the diffraction efficiency at the lens rim.

In the case of many diffractive optical elements in which, as is still being discussed, the diffraction efficiency decreases with smaller structural width, such a variation in the structural height does not, however, result in an improvement in the diffraction efficiency, with the result that the teaching of the specialist paper cannot be generalized. A diffractive optical element having constant structural heights is disclosed in U.S. Pat. No. 5,623,365 A. One of the transmissive diffractive optical elements described therein has the function of a lens having a certain focal length. This necessitates that the widths of the diffraction structures become smaller with increasing distance from the central point. The greater the desired refracting power of such a diffractive optical element with a given refractive index is to be, the greater becomes the variation in the widths of the diffractive structures with the distance from the central point and, consequently, the variation in the ratio of said widths and of the wavelength, which ratio is mainly responsible for the achievable local diffraction efficiency.

In the case of a diffractive optical element according to the type of U.S. Pat. No. 5,623,365 A, said variation in the ratio of structural width and wavelength manifests itself, as calculations based on the electromagnetic diffraction theory have shown, in that the more light is diffracted into other orders of diffraction, the narrower are the diffraction structures. This results in losses in the local diffraction efficiency in the region of narrower diffraction structures, and this results in a variation, usually undesirable, in the local diffraction efficiency of the diffractive optical element.

EP 0 312 341 A2 describes a transmissive diffractive optical element that has a plurality of concentrically disposed diffraction regions that are each designed for different illumination wavelengths and within which there is a constant structural height. Within each of said diffraction regions, therefore, the disadvantages explained in connection with U.S. Pat. No. 5,623,365 A also occur here in the case of a variation of the structural widths, and this affects the dependence of the local diffraction efficiency.

The diffractive optical element in EP 0 312 341 A2 may, in addition, have annular zones that are of opaque or partially transparent design in order to modify the light passing through so as to achieve a desired intensity distribution in the beam path downstream of the diffractive optical element. EP 0 312 341 A2 consequently discloses an optical arrangement wherein the constant structural heights of the diffraction structures for an illumination wavelength also result in the disadvantages that were discussed in connection with U.S. Pat. No. 5,623,365 A.

It is therefore a first object of the present invention to develop a diffractive optical element in such a way that its local diffraction efficiency is optimally adapted to the application purpose.

Said object is achieved, according to the invention, by a diffractive optical element having the features of the present invention.

SUMMARY OF THE INVENTION

Diffractive optical elements are used, for example, to correct for certain aberrations in an optical arrangement, for example the longitudinal color aberration, the color magnification error, the secondary spectrum and also the color variation in the coma. In addition, monochromatic aberrations may also be corrected.

The invention is based on the insight that the height of the diffraction structures can be used as a degree of freedom to modify the local diffraction efficiency of the diffractive optical element and can be altered over the area of the diffractive optical element. At the same time, it was recognized that the teaching of the specialist paper relating to reducing the structural heights so as to increase the diffraction efficiencies of less wide diffraction structures is achieved only in the case of special optical boundary conditions in which an improvement in the blaze effect is achieved by reducing the structural heights and actually results in an increase in the diffraction efficiency. In most other cases, in which the blaze effect is not improved in this way by the structural height change, the teaching of the specialist paper achieves precisely the opposite of the desired effect, namely a reduction in the diffraction efficiency at those points at which it should actually be increased according to the specialist paper, namely in the region of low diffraction structures.

The diffractive optical element according to the invention increases the comparatively low diffraction losses in the region of the wide structures and, thus, matches them to the comparatively large diffraction losses in the region of the less wide structures in such a way that a diffractive optical element results that has a local diffraction efficiency remaining constant over its area, and this is desirable for many application cases. In addition, required patterns of local diffraction efficiencies can be achieved by means of the structural height variation without substantial impairments having to be accepted in other imaging properties of the diffractive optical element in the process.

Because of the structural height variation in the region of the less wide diffraction structures, the diffractive optical element according to the invention has lower efficiency losses due to structural height than in the region of the wider diffraction structures. This is utilized to compensate completely or partly or even to overcompensate for the magnitude of the diffraction efficiency due to structural width in the region of the less wide diffraction structures that inevitably occur in the case of diffractive optical elements having constant structural height. In the case of overcompensation, the diffractive optical element has the highest diffraction efficiency at those points where, normally, the diffraction efficiency is lowest, namely in the region of the diffraction structures having the smallest widths.

In a preferred embodiment of the invention, a diffractive optical element in accordance with Claim 2 has the constant pattern, particularly desired for many application cases, of the diffraction efficiency function over the area of the diffractive optical element. Said pattern is achieved by compensating exactly for the increase in the diffraction efficiency in the case of larger structural widths by a corresponding reduction in the structural height in the region of wide diffraction structures. In this connection, preferably proceeding from an optimum structural height for the diffraction structure, for which known calculating formulae exist, the structural height is reduced.

The diffractive optical element in accordance with Claim 3 makes it possible to fulfill, for example, requirements relating to the diffraction efficiency function of the diffractive optical element, in which the diffraction efficiency function should increase towards the rim of the diffractive optical element. Such a diffractive optical element is able, for example, to compensate for a radially oppositely directed diffraction efficiency decrease of other optical components.

The diffractive optical element in accordance with Claim 4 may be used as an apodization element.

A diffractive optical element in accordance with Claim 5 can be produced with acceptable cost and is not very alignment-critical because of its rotational symmetry.

The diffraction efficiency is increased in then case of a diffractive optical element in accordance with Claim 6.

The diffractive optical element can be designed as a transmissive diffractive optical element in accordance with Claim 7 or as a reflective optical element, depending on application purpose.

A further object of the present invention is to develop an optical arrangement comprising a diffractive optical element according to the preamble of Claim 9 in such a way that its flexibility is increased yet again if the required local total efficiencies are implemented for the optical arrangement.

This object is achieved, according to the invention, by an optical arrangement having the features of Claim 9.

An additional neutral filter makes it possible to implement, for example, fine adjustments to achieve a required total efficiency function. The local total efficiency of the optical arrangement is made up in this connection of the local diffraction efficiency of the diffractive optical element and, optionally, further diffractive optical components and the local transmission of the neutral filter and, optionally, of further optical components. The transmission function of the neutral filter may, in this connection, be stepless, i.e. have a continuous transmission pattern or, alternatively, be graded, i.e. have discrete changes in the transmission.

Since neutral filters are, as a rule, less critical in the alignment of an optical arrangement, an optical arrangement can be realized in which a plurality of neutral filter shaving various transmission functions can be substituted for one another in order, in this way, to achieve different required total efficiency functions. Desired local effects that could be achieved only at higher cost by means of the variation in the structural height of the diffractive optical element can also be produced in such an optical arrangement with the aid of the neutral filter.

An optical arrangement in accordance with Claim 10 is an apodization element that can be used for a number of application cases.

An optical arrangement in accordance with Claim 11 has a reduced number of optical interfaces.

BRIEF DESCRIPTION OF THE DRAWINGS

Exemplary embodiments of the invention are explained in greater detail below by reference to the drawings; in the drawings:

FIG. 2 shows a detail of FIG. 1;

FIG. 3 shows a detail, similar to FIG. 2, of a diffractive converging lens according to the invention;

FIG. 4 shows a detail, similar to FIG. 2, of a further diffractive converging lens according to the prior art;

FIG. 5 to 7 show schematic diagrams of the local diffraction efficiencies of the converging lenses according to FIGS. 2 to 4 as a function of the distance from the central point;

DETAILED DESCRIPTION OF THE INVENTION

Figure 1:
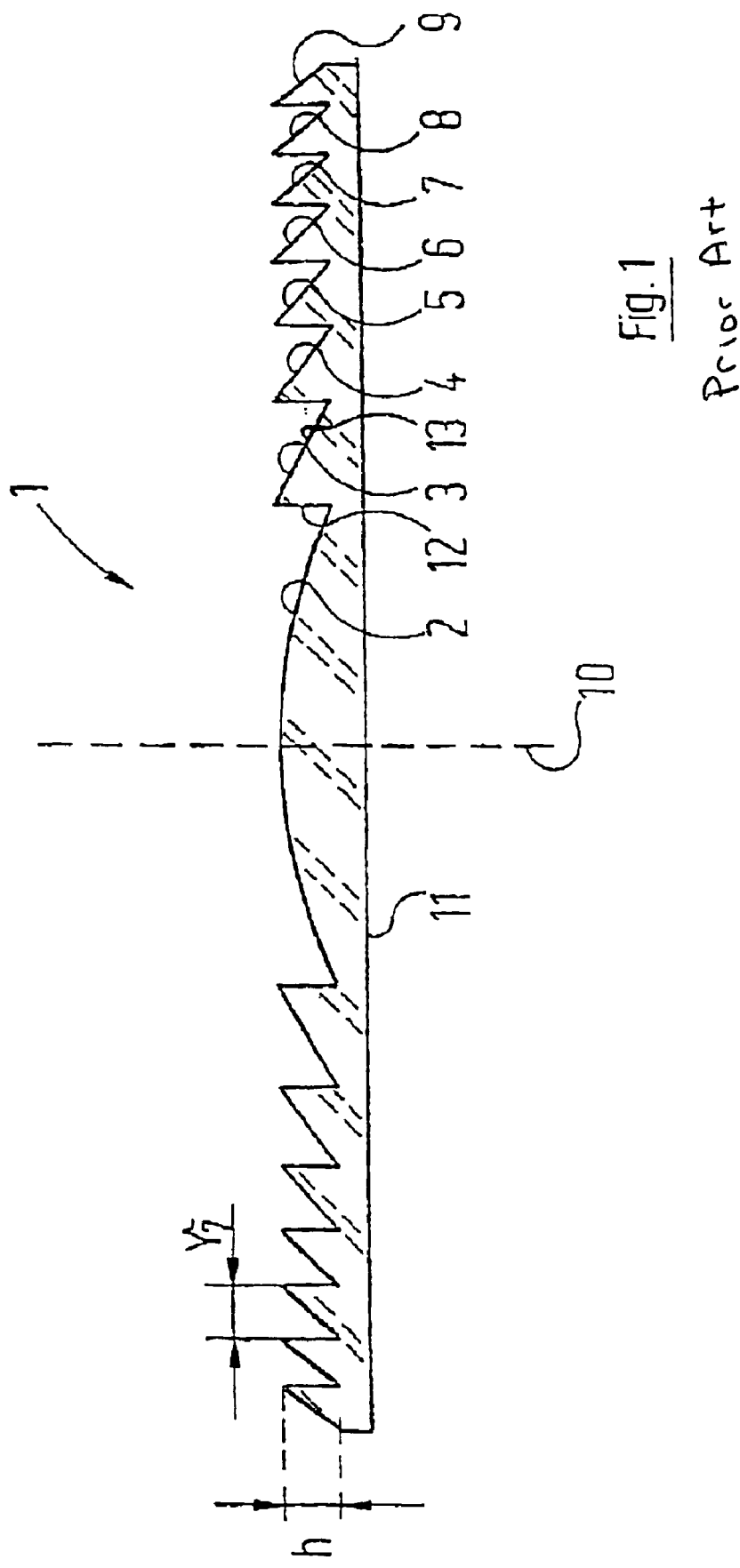
FIG. 1 shows a meridional section through a diffractive converging lens according to the prior art.

The diffractive converging lens denoted in total in FIG. 1 by the reference symbol 1 corresponds to the prior art. On one side, it has a plurality of diffraction structures 2 to 9 that are disposed rotationally symmetrically with respect to the optical axis 10 of the diffractive converging lens 1. On the other side, the diffractive converging lens 1 has a flatly terminating counter surface 11.

The central diffraction structure 2 has a convex surface. Its radial termination forms a cylindrical step surface 12 that is part of the diffraction structure 3 and surrounds the diffraction structure 2 annularly. Adjacent to the step surface 12 is a diffraction surface 13 that slopes radially outwards and that is likewise part of the diffraction structure 3. The diffraction structures 4 to 9 likewise have, like the diffraction structure 3, a step surface and a diffraction surface that alternate radially from the inside outwards in the diffractive converging lens 1. In the meridional section of FIG. 1, this results in a structure, sawtooth-shaped in total, of that surface of the diffractive converging lens 1 situated opposite the counter surface 11.

The diffraction surfaces of the diffraction structures 2 to 9 (cf. diffraction surface 13) slope outwards at an angle that is such that the light is preferentially guided into a certain order of diffraction for which the diffraction condition is fulfilled because of the widths of the diffraction structures 2 to 9. Such an adapted shape of the diffraction structures is denoted as a "blaze profile".

The height h of the diffraction structures 2 to 9, i.e. their extension in the direction of the optical axis 10 from the respective highest point to the respective lowest point of the diffraction structure 2 to 9, is equal for all the diffraction structures 2 to 9. For the diffraction structures 3 to 9, the height h corresponds to the extension of the step surfaces (cf. step surface 12 of the diffraction structure 3) parallel to the optical axis 10.

The width of the diffraction structures 2 to 9, i.e. the radial extension with respect to the optical axis 10, varies over the diffraction structures 2 to 9 in accordance with a required phase function and decreases continuously from the diffraction structure 2 to the diffraction structure 9. The width r 7 of the diffraction structure 7 is shown as representative in FIG. 1. The width of a diffraction structure at a certain distance from the central point is in this case a measure of the phase function achieved in the diffractive converging lens 1.

The heights h and also the widths r are of a size that is comparable with the wavelength of the light for which the diffractive converging lens 1 is to be used. The ratio of the width r and the wavelength used is in this case in the range between 1 and >100.

The rim region of the diffractive converging lens 1 is magnified yet again in the detail shown in FIG. 2.

The radial pattern of the diffraction efficiency T can be calculated on the basis of the electromagnetic diffraction theory for a diffractive converging lens 1 in accordance with FIGS. 1 and 2 having constant height of the diffraction structures.

The result of such a calculation is shown diagrammatically in FIG. 5. Proceeding from a diffraction efficiency value T0, i.e. the diffraction efficiency of the diffraction structure 4, the diffraction efficiency T decreases towards the outermost diffraction structure 9 to a rim value TR. The diffraction efficiency T therefore decreases with respect to the distance R from the central point with decreasing width r of the diffraction structures 4 to 9.

Further embodiments of diffractive converging lenses are discussed below. Components that correspond in this connection to those that have already been described above with reference to the drawing are given reference symbols increased by 100 in each case and are not explained in detail yet again.

The detail diagram of FIG. 3, which is similar to that of FIG. 2, shows a diffractive converging lens 101 according to the invention. The diffraction structures 104 to 109 have the same sawtooth-type basic shape as the corresponding diffraction structures 4 to 9 of the diffractive converging lens 1. The widths r of the diffraction structures 104 to 109 are also equal to those of the diffraction structures 4 to 9 as, for example, a comparison of the widths r7 of the diffraction structure 7 and r107 of the diffraction structure 107 shows.

Those portions of the diffraction structures 104 to 109 extending furthest away from the counter surface 111, that is to say the tips of the sawteeth, are at the same distance from the counter surface 111 for all the diffraction structures 104 to 109, as is the case for the diffractive converging lens 1 according to the prior art. In the case of the diffractive converging lens 101 according to the invention in FIG. 3, however, the height of the step surfaces 114 to 118 of the diffraction structures 105 to 109 decreases with decreasing distance from the central point and, therefore, with increasing width of the diffraction structure. The height of the diffraction structure 105, h105, is therefore less than the height of the diffraction structure 109, h109.

The blaze profile of the diffraction structures of the diffractive converging lenses 101 may be designed as a continuously inclined surface or, alternatively, by means of a known multilevel structure having a staircase-type pattern.

FIG. 6 shows diagrammatically the pattern of the local diffraction efficiency of the diffraction structure 101 as a function of the distance from the central point. The diffraction efficiency T is constant between the diffraction structures 104 and 109 and equal to the rim value of the diffraction efficiency of the diffraction structure 109, TR. This is due to the fact that two effects modifying the diffraction efficiency compensate in the case of the diffractive converging lens 101: on the one hand, the diffraction efficiency increases with increasing width r of the diffraction structures 109 to 104, as already discussed in relation to the diffractive converging lens 1 (cf. FIG. 5). On the other hand, the diffraction efficiency decreases with decreasing height of the diffraction structures 109 to 104. In the case of the diffractive converging lens 101, the height variation is aligned with the width variation in such a way that, in total, a constant diffraction efficiency TR results with respect to the distance R from the central point.

The local diffraction efficiency pattern in the case of a diffractive converging lens 101 that has diffraction structures with an outwardly decreasing width and increasing height, was discussed above with the aid of FIGS. 3 and 6. The result of quantitative calculations based on electromagnetic diffraction theory is shown in FIGS. 8 to 10.

Figure 8:
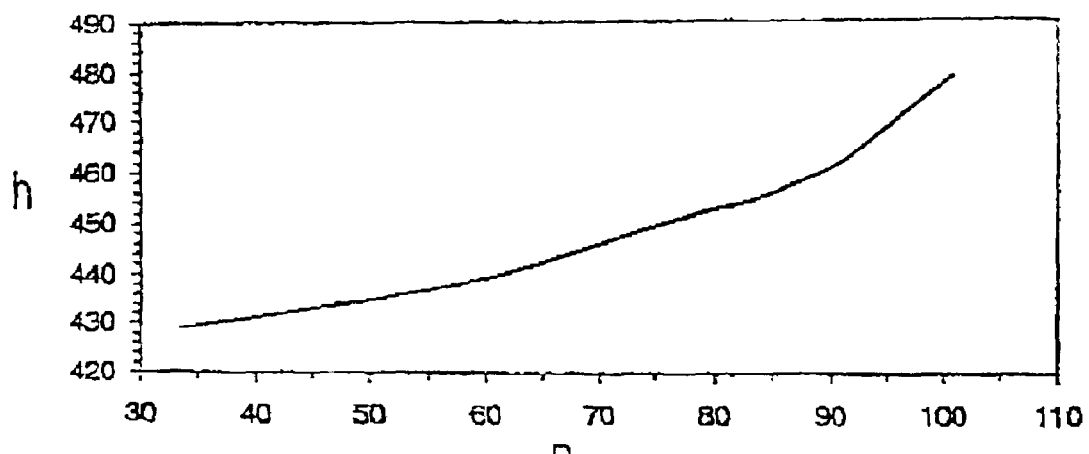
FIG. 8 shows a diagram with calculated structural heights of a diffractive converging lens similar to FIG. 3.
Figure 9:
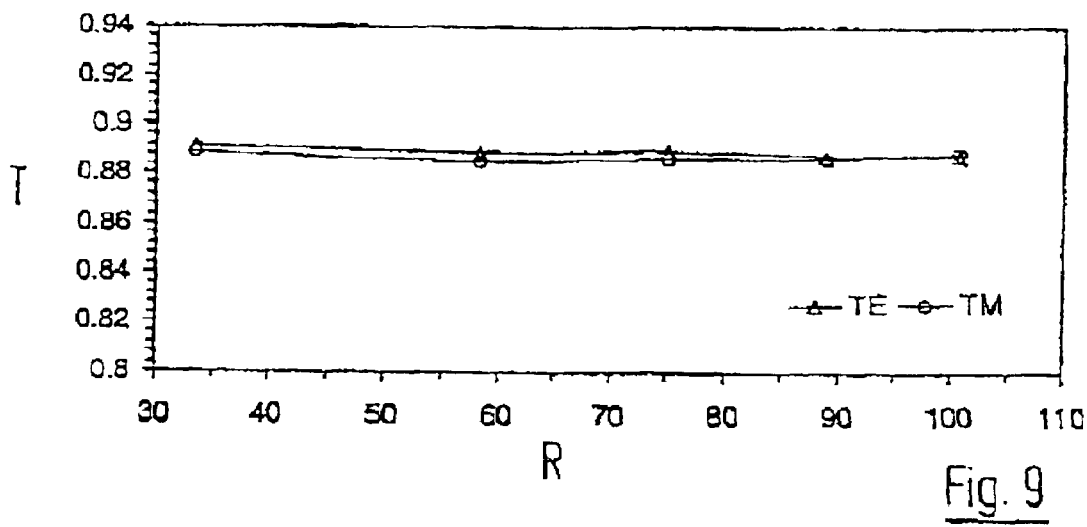
FIG. 9 shows a diagram with calculated local diffraction efficiency patterns of the diffractive converging lens having structural heights in accordance with FIG. 8 as a function of the distance from the central point.

FIG. 8 shows the dependence of the height h, in nm, of the diffraction structures on the distance R from the central point for a diffractive converging lens having a structure that corresponds to the principle according to that of FIG. 3. The height of the diffraction structures at the rim for R=110 mm is h=480 mm. The height h of the diffraction structures decreases progressively in the direction of the central point of the diffractive lens down to a height h=429 nm at a distance R=33 mm from the central point. Plotted against the distance R from the central point, such a pattern of heights h of the diffraction structures results in a diffraction efficiency T that is shown in FIG. 9. Substituted in the calculation of the diffraction efficiency T as parameters were an illumination wavelength of 248.34 nm and also a refractive index of the material of the diffractive converging lens of 1.508. The diffraction structures have a blaze profile.

For both polarization directions TE (open triangles) and also TM (open circles), the diffraction efficiency remains approximately constant at a diffraction efficiency value of approximately 0.89. The diffraction efficiency values for the TE polarization tend to be minimally higher than those for TM polarization. Here, the calculation was again performed without an anti-reflection coating of the diffractive converging lens.

Figure 10:
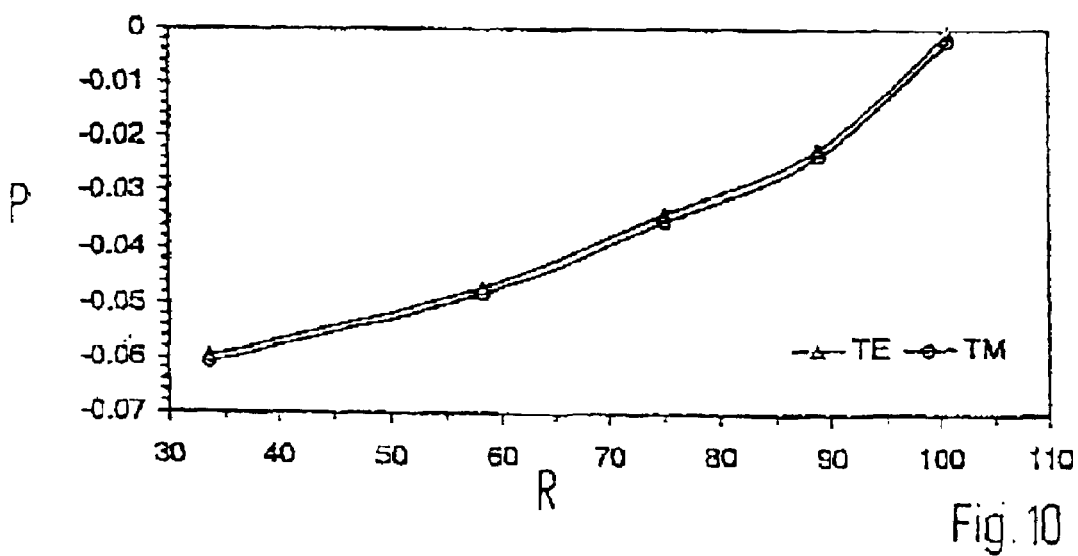
FIG. 10 shows a diagram with calculated local phase patterns of the diffractive converging lens having structural heights in accordance with FIG. 8 as a function of the distance from the central point.

FIG. 10 shows the pattern of the phase P of the light passing through the respective diffraction structures in rad against the distance R from the central point for a height pattern of the diffraction structures in accordance with FIG. 8. The curve shape of the phase pattern corresponds qualitatively to that of the height pattern in FIG. 8. Proceeding from a relative value of 0 rad at R=100 mm, the phase P follows progressively down to a value of −0.06 rad at R=33 mm.

If a constant phase pattern is desired over the cross-section of the illumination beam for an optical arrangement having such a diffractive converging lens, a phase pattern of the type shown in FIG. 10 has to be precompensated for in other optical components, for example in refractive optical components.

Figure 11:
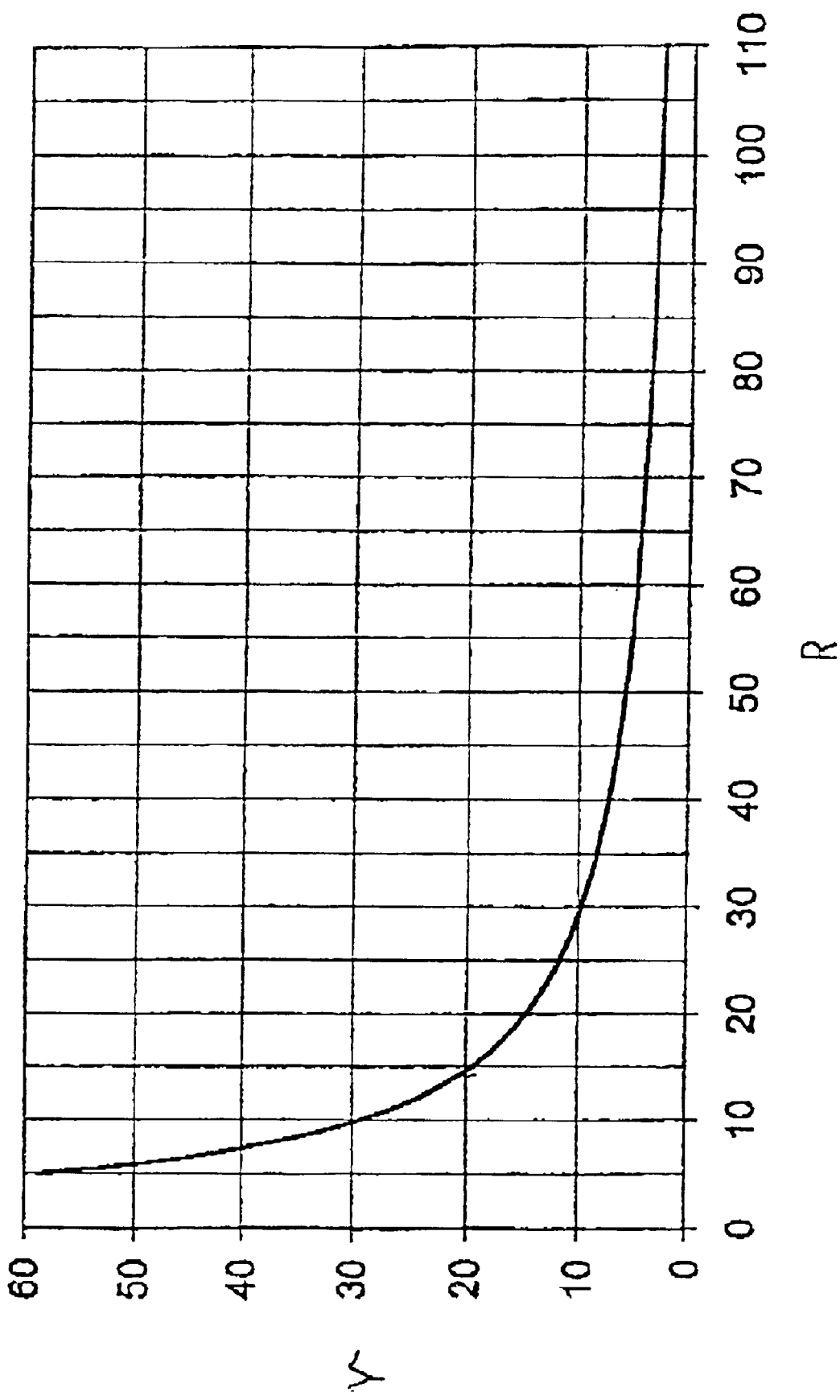
FIG. 11 shows a diagram with calculated structural widths of a diffractive converging lens similar to FIG. 3.

FIG. 11 shows the pattern of the structural width r of the diffraction structures of the diffractive converging lens which results in the diffraction efficiencies in accordance with FIG. 9. Proceeding from the rim of the converging lens (R=110 mm), the structural width increases from a width of r=2.5 m to a width of r=60 min the region of the center of the converging lens (r=5 mm).

A further variant of a diffractive converging lens 201 according to the prior art is shown in FIG. 4. In the latter, the pattern of the heights h of the diffraction structures 204 to 209 is precisely the reverse of that for the diffractive converging lens 101 of FIG. 3, i.e. the heights h decrease from the innermost, widest diffraction structure 204 shown in FIG. 4 to the outermost, narrowest diffraction structure 209. The height of the diffraction structure 209, h209, is accordingly less than the height of the diffraction structure 205, h205.

In the diffractive converging lens 201, the two effects that modify the local dependence of the diffraction efficiency T enhance one another: on the one hand, the width r of the diffraction structures and, on the other hand, their height h decrease outwards, and this results in each case in a reduction in the diffraction efficiency. The consequence is the diffraction efficiency pattern that is shown diagrammatically in FIG. 7. In the latter, proceeding from a diffraction efficiency value T0 of the diffraction structure 204, the diffraction efficiency T decreases as a function of the distance R from the central point with a greater slope than in FIG. 5, thereby resulting in a lowest value of the diffraction efficiency, Tmin, that is lower in the case of the diffractive converging lens 201 than in the case of the diffractive converging lens 1.

It is clear that practically any diffraction efficiency patterns can be established by means of required variations in the widths r and the heights h of the diffraction structures. In this connection, the widths r do not have to decrease monotonically from the inside outwards, as described above, but may also increase monotonically or even have other dependencies that can be described, for example, by exponential functions of the distance R from the central point and may have main and subsidiary maxima or minima.

The diffractive converging lenses 1 to 201 may have an anti-reflection coating to increase their diffraction efficiency.

Figure 12:
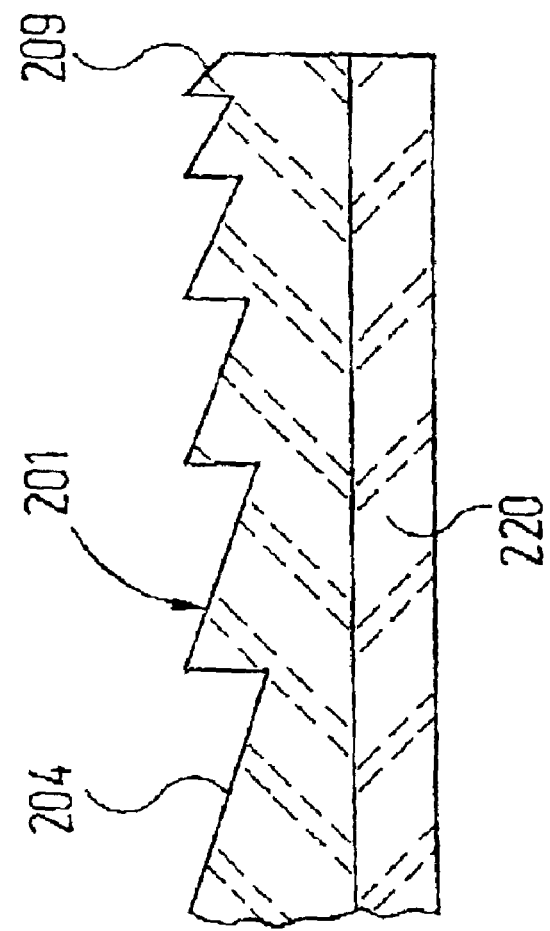
FIG. 12 shows an optical arrangement according to the invention comprising a diffractive converging lens in accordance with FIG. 4.

An additional degree of freedom for setting a desired radial total efficiency pattern for usable light into which both the diffraction efficiencies and the transmissions of the optical elements involved enter results from the use of a neutral filter 220. FIG. 12 shows an optical arrangement according to the invention that is exemplary for this purpose and that shows the combination of the neutral filter 220 with a diffractive optical element in accordance with FIG. 4. The neutral filter 220 is joined to the counter surface 211 of the diffractive converging lens 201. This joint can either be made by means of a suitable optical adhesive or the diffractive converging lens 201 and the neutral filter 220 are coupled to one another optically by means of a liquid having matching refractive index and held in this position.

It is clear that the neutral filter 220 can be combined with any diffractive optical elements having varying structural heights, in particular also with that in FIG. 3.

The diffractive structure can also be applied directly to the neutral filter. For this purpose, the diffractive optical element and the neutral filter are made from one material. The diffractive optical element can then be structured in the neutral filter itself.

The neutral filter 220 has, in the region of the diffraction structure 204, complete transparency, whereas it is completely opaque in the region of the diffraction structure 209.

Figure 13:
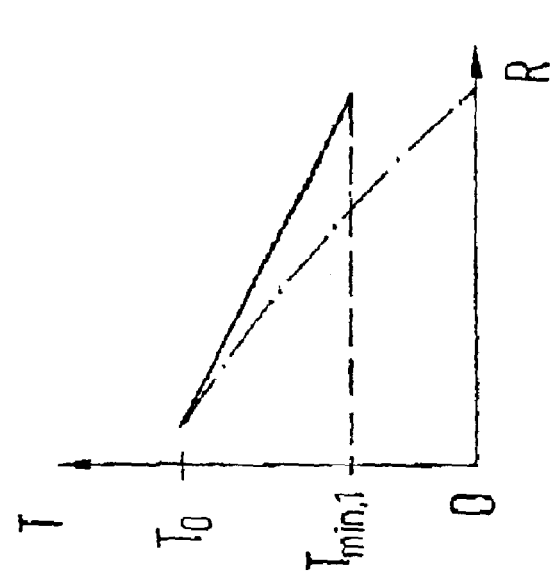
FIG. 13 shows a schematic diagram with the local diffraction efficiency pattern of the optical arrangement in accordance with FIG. 12.

The total efficiency pattern of the optical arrangement comprising the diffractive converging lens 201 and the neutral filter 220 is illustrated in FIG. 13. In the latter, as in FIG. 7, the local diffraction efficiency pattern of the diffractive converging lens 201 is shown as a full line. The local total efficiency pattern of the optical arrangement comprising the diffractive converging lens 201 and the neutral filter 220 is shown in FIG. 13 as a chain-dot line. Proceeding from a value TO for the innermost diffraction structure 204 in FIG. 12, the total efficiency of the optical arrangement decreases to 0 towards the rim.

Of course, the diffractive converging lens 201 and the neutral filter 220 may also be components that are spatially separated from one another.

Alternatively, the neutral filter may also be replaced by a metal coating of the diffractive converging lens. Such metal coatings, which have a required transmission pattern, are known.

The efficiency considerations stated within the framework of the description of the figures may also be put forward analogously for a reflective diffractive optical element. In this case, too, the same basic dependencies of the diffraction efficiency on the structural width or the structural height exist.

In the case of a reflective diffractive optical element, a reflective coating is normally used to optimize the reflection efficiency. In this connection, a metal coating or a dielectric, highly reflective (HR) coating may be used. The diffractive structure may be disposed in this latter case on or under the HR layer system. The material of the diffractive structure may differ in both cases from the materials used in the HR layer system. Particularly good efficiency results are obtained if the refractive index of the layer of the HR layer system that is immediately adjacent to the diffraction structures is chosen in such a way that the inner periodicity of the HR layer system is continued by the layer that is required by the diffraction structures. In the case of an HR layer system having alternating high-refractivity and low-refractivity layers, the first layer of the HR layer system that is immediately adjacent to the diffraction structures should, for example, be highly refractive if the layer that is required by the diffraction structures is of low refractivity.

What is claimed is:

1. A diffractive optical element comprising a plurality of diffraction structures each having a width, which is measured in a plane defined by an overall extension of the diffractive optical element, and a height, which is measured vertically to the plane, wherein wider diffraction structures have a lower height than less wide diffraction structures such that the wider diffraction structures have a larger diffraction efficiency than less wide diffraction structures.

2. The diffractive optical element according to claim 1, wherein the diffractive optical element includes a radius such that the diffraction structures are disposed coaxially and annularly, wherein the radially measured widths and the axially measured heights vary over the radius of the diffractive optical element.

3. The diffractive optical element according to claim 1, further including a coating that increases the diffraction efficiency.

4. The diffractive optical element according to claim 1, wherein the diffractive optical element is of a transmissive design.

5. The diffractive optical element according to claim 1, wherein the diffractive optical element is of reflective design.

6. A diffractive optical element comprising a plurality of diffraction structures each having a width, which is measured in a plane defined by an overall extension of the diffractive optical element, and a height, which is measured vertically to the plane, wherein wider diffractions structures have a lower height than less wide diffraction structures such that a local diffraction efficiency of the diffractive optical element is a linear function of a distance of the diffraction structures from a central point of the diffractive optical element.

7. A diffractive optical element comprising a plurality of diffraction structures being disposed rotationally symmetrically with respect to an optical axis of the diffractive optical element and each having a width, which is measured in a plane defined by an overall extension of the diffractive optical element, and a height, which is measured vertically to the plane, wherein wider diffraction structures have a lower height than less wide diffraction structures, and wherein the widths of the diffraction structures increase monotonically from a central point of the diffractive optical element.

8. A diffractive optical element comprising a plurality of diffraction structures being disposed rotationally symmetrically with respect to an optical axis of the diffractive optical element and each having a width, which is measured in a plane defined by an overall extension of the diffractive optical element, and a height, which is measured vertically to the plane, wherein wider diffraction structures have a lower height than less wide diffraction structures, and wherein the widths of the diffraction structures vary as a function of a distance from a central point of the diffraction optical element, the function having at least one intermediary maximum or minimum.

* * * * *